United States Patent
Ezra

(10) Patent No.: US 7,679,826 B2
(45) Date of Patent: Mar. 16, 2010

(54) DIFFRACTIVE, POLARIZATION MODULATING OPTICAL DEVICES

(75) Inventor: David Ezra, Oxon (GB)

(73) Assignee: DE Technologies Limited, Oxon (GB)

( * ) Notice: Subject to any disclaimer, the term of this patent is extended or adjusted under 35 U.S.C. 154(b) by 0 days.

(21) Appl. No.: 10/586,361

(22) PCT Filed: Jan. 19, 2005

(86) PCT No.: PCT/GB2005/000171

§ 371 (c)(1), (2), (4) Date: Jul. 18, 2006

(87) PCT Pub. No.: WO2005/071497

PCT Pub. Date: Aug. 4, 2005

(65) Prior Publication Data

US 2007/0053028 A1    Mar. 8, 2007

(30) Foreign Application Priority Data

Jan. 19, 2004    (GB)    ................... 0401060.9

(51) Int. Cl.
*G02B 5/18* (2006.01)
(52) U.S. Cl. .................. 359/573; 359/569; 359/575
(58) Field of Classification Search ............. 359/569, 359/573, 575
See application file for complete search history.

(56) References Cited

U.S. PATENT DOCUMENTS

| 4,251,137 A * | 2/1981 | Knop et al. ............ 349/201 |
| 4,659,112 A | 4/1987 | Reiner et al. |
| 4,728,377 A | 3/1988 | Gallagher |
| 5,145,212 A | 9/1992 | Mallik |
| 5,284,364 A | 2/1994 | Jain |
| 5,903,330 A | 5/1999 | Fuenfschilling et al. |
| 6,061,122 A | 5/2000 | Hoshino et al. |
| 6,124,970 A | 9/2000 | Karassev et al. |

(Continued)

FOREIGN PATENT DOCUMENTS

EP    0 689 085    12/1995

(Continued)

OTHER PUBLICATIONS

Moia F: "New coloured optical security elements using Rolic's LPP/LCP technology: devices for 1$^{st}$ to 3$^{rd}$ level inspection" Proceedings of the SPIE, SPIE, Bellingham, VA, US, vol. 4677, Apr. 18, 2002, pp. 194-202, XP002273603 ISSN: 0277-786X cited in the application, the whole document.

(Continued)

*Primary Examiner*—Joshua L Pritchett
(74) *Attorney, Agent, or Firm*—Young & Thompson

(57) ABSTRACT

An optical device includes an encoding surface having a micro-relief pattern (22) over at least part thereof designed to produce a predetermined diffracted first image when illuminated in use, and an optically anisotropic layer (26) such as a polymerized liquid crystal provided whereby at least part of the micro-relief pattern (22) induces local orientation of the optically anisotropic layer (26) thereby to impose a predetermined polarization modulation, thereby to produce a predetermined polarization dependent second image when illuminated in use.

30 Claims, 3 Drawing Sheets

U.S. PATENT DOCUMENTS

| | | |
|---|---|---|
| 6,301,047 B1 | 10/2001 | Hoshino et al. |
| 6,496,287 B1 | 12/2002 | Seiberle et al. |
| 2001/0050815 A1* | 12/2001 | Ishihara et al. ............. 359/566 |
| 2002/0110651 A1 | 8/2002 | Suzushi et al. |
| 2003/0067460 A1* | 4/2003 | Tomono ..................... 345/419 |
| 2004/0095637 A1* | 5/2004 | Nikolov et al. ............. 359/352 |

FOREIGN PATENT DOCUMENTS

| | | |
|---|---|---|
| EP | 0 911 758 | 4/1999 |
| EP | 1 028 359 | 8/2000 |
| EP | 0 689 065 | 6/2001 |
| EP | 1 120 737 | 8/2001 |
| EP | 1 203 968 | 5/2002 |
| EP | 0 689 084 | 6/2003 |
| EP | 1 327 895 | 7/2003 |
| WO | WO 03/062872 | 7/2003 |
| WO | WO 03/069587 | 8/2003 |
| WO | WO 2004/095090 | 11/2004 |

OTHER PUBLICATIONS

Drinkwater et al., "Development and applications of diffractive optical security: Devices for banknotes and high value documents," *Proceedings of SPIE*, vol. 3973, 2000, pp. 66-77.

Staub et al., "Non-standard diffraction structures for OVD's," *SPIE*, vol. 3314, pp. 194-199.

Renesse (ed.), *Optical Document Security*, 1994, p. 152, Artech House.

*Practical Holography*, Chapter 20, "Embossed Holograms," 1998, p. 288, Graham Saxby Prentice Hall.

Moia et al., "Optical LPP/LCP Devices: A New Generation of Optical Security Elements," *Proceedings of SPIE*, vol. 3973, 2000, pp. 196-203.

Van Renesse, "Synergistic combination of document security techniques," *Proceedings of SPIE*, vol. 3973, 2000, pp. 126-138.

Takeuchi et al., "CPLgram: An advanced machine readable OVD that is obtained by combining diffraction gratings and liquid crystals," *Proceedings of SPIE*, vol. 33973, 2000, pp. 23-246.

Berreman, "Alignment of Liquid Crystals by Grooved Surfaces," *Molecular Crystals and Liquid Crystals*, vol. 23, 1973, pp. 215-231.

Lee et al., "Control of Liquid Crystal Alignment Using Stamped-Morphology Method," *Japanese Journal of Applied Physics*, vol. 32, 1993, pp. L1436-L1438.

Soloviev et al., "Alignment of reactive LC mesogen by relief diffraction grating," Liquid Crystal Materials, Devices, and Applications VIII, *Proceedings of SPIE*, vol. 4658, 2002, pp. 137-141.

Broer, "Invited Paper: Molecular Architecture in Thin Plastic Films by In-Situ Photopolymerisation of Reactive Liquid Crystals," *SID 95 Digest*, pp. 165-168.

*Merck Technical Data Sheet*, "RMS03-001: Coatable Solutions of Polymerisable Nematic Mixture," Jun. 2003, 2 pp.

Newswanger, Mass Replication of Holograms and Diffraction Gratings by Embossing, "CGC International: Embossed Holograms," 5 pp.

\* cited by examiner

Reflective mode

Transmissive mode reflective mode

DIFFRACTIVE, POLARIZATION MODULATING OPTICAL DEVICES

The present invention relates to optical devices, to methods for fabricating such devices, and to articles incorporating such devices. The invention also extends to methods of authenticating articles, documents etc. using such devices, and to optical data storage.

In one aspect the invention relates to optical devices primarily used to provide optical security for valuable documents and identification products such as ID cards, passports, visas, currency, security threads and branded goods. However, in other aspects such devices may be adapted for other purposes.

There are, broadly speaking, a number of families of known optical security devices. One important type of these is known under the acronym DOVID (Diffractive Optically Variable Image Device), otherwise referred to herein as type A devices. In these devices images and/or information are encoded in the form of diffractive micro-optical structures. A large variety of different features based on diffractive structures are known. These include classical holograms but increasingly many of them use a variety of grating structures which allows for much wider range of visual impressions. Most DOVIDs in use today are manufactured as embossed surface relief microstructures by a process of roll-to-roll embossing into suitable thermoplastics, or by hardening of UV curable materials in contact with a master with a suitable relief structure. There are many different embossed substrates and several types of embossing systems in use depending on specific applications and volume of manufacture. These encoded diffractive structures usually produce a variety of image and colour effects which are visible to the naked eye. For added security diffractive features may also be encoded to provide machine readable effects, or effects induced by invisible radiation.

Prior to embossing, optical means, mechanical machining or electron beam writing are used for origination. The output of the origination process, normally a surface relief hologram or a diffractive structure is replicated into thin shims, e.g. of nickel, used for embossing. This is done by depositing a thin conductive layer on the resist master, using a silver spray or vacuum deposition system, before electroplating from this master a first thick metal copy master shim usually of nickel. A family tree of master and sub-master shims are then built up by successive electroplating processes until the embossing shims themselves are produced. The typical pitch of the embossed structures is around 0.3 to 5.0 microns and their depth around 0.1 to 1.0 microns. Other types of diffractive structures may be smaller or larger. The diffractive effects are mainly due to the local orientations and spacings of grating structures, whereas the profile depths, to a first approximation, determine the diffractive efficiency.

Embossing is normally done by attaching a shim around a heated roller and then embossing into a thermoplastic layer coated on a carrier layer, or into suitable thermoplastic substrate under heat and pressure. Other methods include hardening of UV curable materials in contact with the relief structure of the shim. To provide a reflective layer behind the embossed relief structure the materials are usually metallised with aluminium or other material using large vacuum coaters, although other reflective layers are possible to give different results for example multi-layer dielectric coatings or a dielectric stack. After deposition the materials are adhesive coated. Various adhesive materials are normally used, carefully tailored for each application. The product is then typically cut to the required shape and size for the particular application. Thus for security threads or tear tapes materials are slit, and for labels the material is die cut. Then, if required, the cut items are individually numbered using, for example, inkjet or thermal printing systems for applications requiring audit control or traceability. In many cases hot stamping foils are produced for the direct transfer of DOVID to an appropriate part of the article.

In the main, even though these type A security features have become more easily recognisable and accepted by the general public, there have been cases where they have been counterfeited thus compromising their integrity. There is therefore an increasing requirement to add another level of security to these and other optical security devices whilst not complicating the origination and production processes and without adding significant cost.

Examples of origination, mastering and manufacturing are well known, for example in the following publications and references therein, the contents of which are incorporated herein by reference:

U.S. Pat. No. 5,145,212

U.S. Pat. No. 4,728,377

"Developments and Applications of Diffractive Optical Security Devices for Bank Notes and High Value Documents", Proceedings of SPIE, Vol 3973 (2000), pp 66-77;

"Non-standard Diffraction Structures for OVDs", SPIE Proc, Vol 3314 (1998), p 194;

"Optical Document Security", Rudolf van Renesse, editor, Artech House 1994 (IBSN: 0-89006-619-1), and "Practical Holography", Graham Saxby Prentice Hall 1988 (ISBN 0-13-693797-7, Chapter 20—Embossed Holograms).

In a second family of optical security devices (referred to herein as type B devices) image/information are encoded as structured optical retarders (normally latent in unpolarized light). Generally the image is invisible when viewed by the naked eye, but becomes visible when viewed with the aid of polarizers. U.S. Pat. No. 5,284,264 and U.S. Pat. No. 6,124,970 disclose simple methods of creating and viewing such images. Another method of creating and viewing these elements is disclosed in the references listed below. This method uses a linear photo-polymerisable process (LPP) for photo-patterning of liquid crystal aligning layers to produce spatially patterned optical retarders when a suitable layer of liquid crystal monomers or polymers is coated on top of the LPP patterned layer. The orientation of nematic liquid crystal molecules is defined by the nematic director. The alignment layer consists of a photo-oriented polymer network which defines regions of alternating orientations in liquid crystal film. The orientation is characterized by a spatially-dependent variation of the direction of the optical axis which is fixed by a subsequent cross-linking step, thus forming an optically structured liquid crystal monomer or pre-polymer (LCP) layer with a pre-established orientation pattern.

This layer exhibits a birefringence that corresponds to a specified retardation ($\lambda/2$, $\lambda/4$ etc). By selecting a particular thickness of the LLP layer, the LCP layer therefore generates a corresponding optical retarder effect dependent on the thickness. By stacking LPP/LCP layers with specific retardation values, various colour effects can be produced when viewed with the aid of polarizers. The origination, mastering and manufacturing processes of this class of type B device, in general, are completely different from those used for type A devices, and they are less suitable for volume low cost manufacturing as they require direct exposure of each element produced.

A description of this method can be found in the following publications, the contents of which are incorporated herein by reference:

U.S. Pat. No. 5,284,264;
U.S. Pat. No. 6,124,970 (WO99/21035);
"Optical LPP/LCP Devices—A New Generation of Optical Security Elements" Proceedings of SPIE Vol 3793 (2000), pp 196-203;
"New Coloured Optical Security Elements Using LPP/LCP Technology" Proceedings of SPIE Vol. 4672 (2002);
EP0,689,065;
EP0,689,084, and
U.S. Pat. No. 6,496,287.

In a third family of optical security devices, liquid crystal effects and diffractive effects are combined but there is no optical synergy or interaction between the two effects; these hybrid devices are referred to herein as type C devices. In a development by NHK Spring (Japan) diffractive and interference effects are used to form the so-called CPLgram (CPL—Circularly Polarized Light). A semi transparent thin film of polymerised Cholesteric Liquid Crystal CLC evokes the interference effect, while embossed diffraction gratings are underneath this LC film. In specular reflection, the CLC film acts as an efficient Bragg mirror and reflects a waveband that shifts from gold to blue-green with angle of observation. Both this Bragg reflection and the light diffracted from the embossed features are circularly polarized. In this device the gratings and the Cholesteric Liquid Crystal structures are separate. The Cholesteric LC layer is just overlaid, the grating does not align the CLC and the CLC does not comply with the grating structures.

A description of this technology may be found in the following, the contents of which are incorporated herein by reference:

U.S. Pat. No. 6,301,047;
EP0911758 A3;
EP1327895 A1;
WO03/069587 A1
SPIE Proc, Vol 3793 (2000), p 133, and
SPIE Proc, Vol 3793 (2000), 238.

There are a number of ways of aligning liquid crystal materials on surfaces. One method, as mentioned above, uses a photo oriented polymer network (LPP).

Another proposed method of aligning liquid crystal materials is by micro-grooved or micro-structured surfaces. Some of these liquid crystal materials can also be polymerised to create fixed structures, which exhibit optical retarder effects as in type B devices. E. S. Lee et al listed below describe structures of microgrooves of 0.05 micron and 0.525 micron pitch and of 0.278 micron and 1.11 micron depth respectively. Sovoliev et al, listed below, describe grating structures of pitch between 2 to 5 micron and depths of 0.08 to 0.4 micron.

Information can be found in the following, the contents of which are incorporated herein by reference:

"Alignment of Liquid Crystals By Grooved Surfaces", Dwight W Berreman, Molecular Crystals and Liquid Crystals, Vol. 23 (1973), pp 215-231;
"Control of Liquid Crystals Alignment Using Stamped Morphology", E. S. Lee et al, Japanese J of Applied Physics, Vol. 32 (1993), pp L 1436-L 1438;
"Alignment of Reactive LC Mesogen By Relief Diffractive Grating", Vladimir Sovoliev et al, Proceedings of SPIE Vol. 4658 (2002), pp 133-136;
WO03/062872;
"Photopolymerisation of Reactive Liquid Crystals", D. J. Broer SID 95 Digest, pp 165-169, and
"Merck Technical Sheet, RMS03-001 Coatable Solutions of Polymerisable Nematic Mixture", Jun. 11, 2003.

SUMMARY OF THE INVENTION

According to one aspect of this invention there is provided an optical device comprising an encoding surface having a micro-relief pattern over at least part thereof designed to produce a predetermined diffracted first image when appropriately illuminated in use, and an optically anisotropic layer whereby at least part of said micro-relief pattern induces local orientation of said optically anisotropic second layer thereby to impose a pre-determined polarization modulation, thereby to produce a pre-determined second image when appropriately illuminated and viewed in use.

The pattern on the encoding surface is typically in the form of a micro-relief pattern which acts also as an alignment surface to align the optically anisotropic layer to provide a phase-modulating structure. In this way, the device may display the optical security features of the type A devices as well as optical phase features of the type B devices. The encoding surface may be formed or fixed on a surface of the optically anisotropic material, or it may be provided on a micro-relief layer which is left in contact with the optically anisotropic material thereby to define said encoding surface.

In one arrangement, the device may in its bare form simply comprise a layer of optically anisotropic material with the encoding surface provided on a surface thereof, to define a free-standing device. This could be manufactured by using a curable liquid crystalline material and fixing the encoding surface therein by applying the liquid crystalline material to a master which bears the required coding surface, allowing orientation to occur and then fixing the liquid crystalline material to make it solid and then removing the master. Likewise a hot embossing process could be used to produce a self-standing device.

It should be appreciated that the term 'image' is used broadly to cover any optically discernible pattern which in its simplest form may comprise a pattern of light and dark regions. Although in many instances, the optical device may be designed to be viewed and authenticated in the visible band of radiation, it will be appreciated that the light used to illuminate the device may be outside the visible range. The 'image' may be viewable by the naked eye or with the aid of a suitable optical device, or by a suitable machine. In some instances it may be particularly useful for one of the images to be readily viewable by the human eye, with or without another component such as a polarizer, with the other image being hidden and only viewable with more sophisticated equipment. The term image also encompasses any pattern whether identifiable visually as e.g. an icon, logo, colour pattern etc., or a spatial distribution of information, such as encoded features, with the naked eye, or with suitable optical equipment as described above. Thus it covers for example an array of pixels each encoded as a code symbol.

The term 'surface' is broadly used to mean a surface or interface. Thus in this context a surface could be an exposed surface or it could be covered by another layer or a substrate. In the context of an encoding surface as used herein in connection with the optically anisotropic layer, it may be used to describe both a patterned surface on the anisotropic material itself, for example fixed by a master subsequently removed, or the interface between the anisotropic layer and a suitably patterned adjacent layer.

The optically anisotropic layer may be of any optically anisotropic material that modulates the polarization mode of radiation incident thereon, such as e.g. a liquid crystal material type which is capable of being processed to form a solid film so that the molecular alignment between the film and the aligning layer can be suitably preserved. These materials include, for example, polymerisable liquid crystalline materials and polymer liquid crystal materials.

In this manner, the same origination and manufacturing process may be used to provide both types of security features. These devices can be mass produced by using origination, mastering and manufacturing techniques similar to those produced for type A. Hence type B effects and combined type A and type B effects could be integrated with a type A effects, on a single device made using the origination, mastering and manufacturing techniques used for constructing type A devices. In this way security is enhanced with little or no added origination, mastering and manufacturing costs.

The encoding surface of the device may include one or more relatively strongly diffractive micro-relief regions having a significant diffractive effect and one or more relatively weakly diffractive micro-relief regions where there is little or no diffractive effect. In the regions where there is little or no diffractive effect, the encoding surface may still include a micro-relief structure capable of orienting the optically anisotropic second layer. The micro-relief regions may have a generally regular or periodic structure or they may have a non-periodic or quasi random structure.

Preferably the encoding surface includes a plurality of areas or domains, each of which having a respective orientation of the micro-relief pattern thereon, defining respective optical axes.

In a device for storage of data, the encoding surface may define an array of pixels at each of which there may be a selected one of a number of different orientations, thereby representing a multi-state code symbol.

In one arrangement, the pitch and the structure depth of the micro-relief patterns may be generally similar to those used in conventional type A devices so that the finished device provides both a significant diffractive effect and also phase modulation properties. For the visible wavelengths, typical values for pitch for the structure lie in the range of 0.3 µm to 2.0 µm and for depth 0.1 to 0.5 µm. In some embodiments a micro-relief structure may be modified to include further features or coding, by selectively modifying or removing the micro-relief pattern. For example, information could be written by suitable laser to ablate or obliterate part of the pattern. As well as modifying or obliterating the micro-relief pattern to introduce further features, the birefringence of the optically anisotropic material may be modulated or changed locally to affect the polarization modulation, e.g. to write information or to personalise on the device. Modification of the birefringence (or the structure) may be done by heat, physical contact, laser, or other chemical or physical effects.

Where there are instances where it is required for there to be little or no diffraction, the appropriate area or domain of the encoding surface may have a micro-relief pattern depth of less than 0.05 µm. This will produce very low diffraction efficiency. Furthermore, if a pitch of less than 0.2 µm is selected then all diffraction orders in the visible region will be suppressed.

The devices of this invention may be used either in transmission or reflection mode.

In one embodiment, the thickness of at least part of the optically anisotropic layer is selected having regard to the frequency of the intended illumination in use to provide a ½λ phase retardation when appropriately viewed. In another embodiment, the coating thickness of at least part of the layer may be selected to provide a ¼λ phase retardation when appropriately viewed.

It will be appreciated that this allows optical devices to be produced with various adjacent domains. Each domain may provide both a diffractive effect and a phase modulation or retardation effect, or it may provide just a phase modulation or retardation effect only. In the latter instance the local micro-relief structure will be such as to provide little or no diffractive effect. In other instances, depending on the polarization of the illumination light, it may be possible to provide domains in which the polarization modulation effect, whilst present, is not apparent, due to the appropriate orientation of the plane of polarization of the illumination light with the optical axis of the anisotropic second layer.

Thus, the encoding surface may be designed so that over most if not all of its operating area it serves both to produce a diffractive image and also to produce a polarization encoded image. However, numerous hybrid arrangements are possible. Thus the encoding surface may have at different locations thereon a region which generates a diffraction image and separately therefrom a region which produces a polarization encoded image. These systems share the common advantage with both types of features that the encoding surface can be produced using the same manufacturing steps. Equally, the encoding surface may have one or more regions with a micro-relief pattern which acts to generate both a diffracted image and a polarization encoded image; one or more regions which exhibit just the former functionality, one or more regions which exhibit just the latter, and one or more regions which have no functionality, or sub-permutations of these features.

In order to provide further modulation effects, the thickness of the coating of the optically anisotropic layer and/or its birefringence may vary with position across the device, to vary the optical retardation induced thereby. In one example, the encoding surface is stepped, whereby adjacent micro-relief patterns are stepped in the sense of the thickness of the layers by a step distance which is substantially greater than the micro-structure pitch dimension, thereby to provide corresponding variations in thickness in the optically anisotropic layer and thus regions of respective selected retardations. The stepping may vary in one or two dimensions to provide a staircase effect or pixellated effect.

In another arrangement, the encoding surface (excluding the micro-relief pattern) may be generally continuously contoured and so, for example, the encoding surface may be generally planar but non-parallel to the upper surface of the optically anisotropic layer.

As noted, the optical device may be used in reflection or transmission modes; when used in reflection mode, encoding surface, or the interface between the encoding surface and the optically anisotropic layer may be rendered reflective over at least part thereof. Alternatively, the encoding surface may be provided on a transmissive layer and at least part of the surface of the this layer remote from the interface with the optically anisotropic layer may be reflective. Furthermore, the surface of the optically anisotropic layer remote from the encoding surface may be reflective. Thus in some arrangements, the reflective surface may be provided over only part of the device, such that it is used partly in reflection mode and partly in the transmission mode. Reflectivity may be provided by e.g. metallization. Further information or modulation may be imparted by metallising through a mask to create a pattern of reflective material or by selectively removing metallization. Reflectivity may also be provided by multiple layers of dielectric material.

By providing e.g. stepped variations in the coating thickness of the optically anisotropic layer, specific retardations may be provided which may produce a colour effect in response to illumination with visible radiation when appropriately viewed, e.g. by cross polarizers.

The invention also extends to a method of producing an optical device which comprises providing an encoding surface having a micro-relief pattern over at least thereof designed to produce a pre-determined diffracted first image when appropriately illuminated in use, and providing an optically anisotropic layer, wherein at least part of said micro-relief pattern induces local orientation of said optically anisotropic layer thereby to impose a pre-determined polarization modulation and thereby to produce a pre-determined second image when appropriately illuminated in use.

The micro-relief pattern may be produced in a variety of ways including embossing.

The invention extends to articles per se which include an optical device as described above, such as for example bank notes, passports, security documents, ID cards, containers, packaging.

The invention further extends to a method of authenticating an article which comprises applying to said article an optical device as described above to provide identifiable first and second images when appropriately viewed, and thereafter examining said article for presence of at least one of said first and second images.

It will be appreciated that the reading of the first and second images may be by the naked eye or by machine and in certain circumstances, one image may be read by eye and the other by machine, or by the naked eye with the aid of a simple optical element.

The invention also extends to an optical storage device comprising an optical device as described above wherein the micro-relief pattern comprises a plurality of pixels or regions each containing a respective micro-relief pattern thereon, which defines a respective optical axis.

Whilst the invention has been described above, K extends to any inventive combination of the features set out above or in the following description.

DESCRIPTION OF THE PREFERRED EMBODIMENTS

The invention may be performed in various ways, and various embodiments thereof will now be described by way of example only, reference being made to the accompanying drawings, in which:—

BACKGROUND

It has been shown that surface relief structures of diffractive elements (or indeed various different surface relief patterns or functions) can be formed into suitable receptive material by any one of many known methods.

Figure 1:
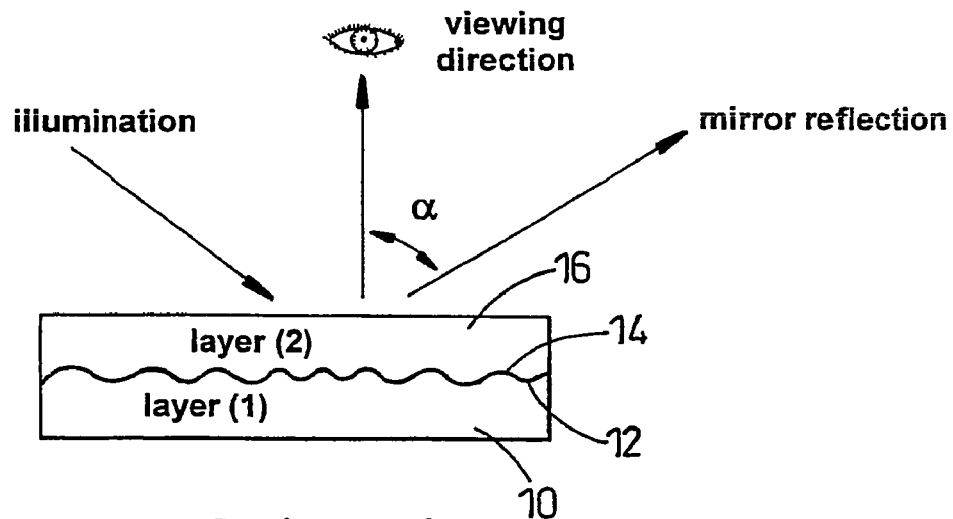
FIG. 1 is a schematic view of a typical known form of embossed holographic or diffractive security device (type 'A') for use in reflective mode.

FIG. 1 of the drawings shows the basic structure of an embossed holographic or diffractive security device, referred to above as a type 'A' device. As shown, the device comprises a substrate layer 10 of a UV curable resin or an embossable thermoplastic. The substrate carries a micro-relief grating pattern 12 and a very thin layer of metal or multi-layer reflective coating 14 (eg vacuum deposited). An upper layer 16 of UV curable resin or other isotropic material with a refractive index n of typically around 1.45 to 1.6 is coated onto the substrate. In such an arrangement, with an embossed surface with pitch p, the direction of the diffracted orders is determined by:—

$$\sin(\theta_m) = \sin(\theta_o) + m \cdot \lambda/p \quad \text{(Equation (1))}$$

Where $\lambda$ is the wavelength of the diffracted light, p is the grating pitch (period) and m is the diffraction order. $\theta_m$ and $\theta_o$ correspond to the angles between the normal to the reflection surface and the directions of orders m and o. when m=0, (zero order), this corresponds to the mirror reflection (undiffracted light).

In practical devices used in security applications (holograms, diffractive gratings) typical parameters are:

D (structure depth) about 0.1 to 0.5 µm p (structure pitch/period) about 0.4 to 2.0 µm In FIG. (1) for the first order $\sin(\alpha) = \lambda/p$, where $\alpha$ is the angle between the light diffracted into the first order and the mirror reflection (zero order). For $\lambda = 0.5$ µm (average of visible light), and p=1 µm, the above expression gives $\alpha = 30°$. It should be noted that for the special case of vertical illumination the values $\theta_o = 0$, $\theta_m = \alpha$ are obtained. The diffractive effects are mainly due to the local orientations and spacings of the gratings. However, the profile-depths of the grating, to a first order, determine the diffraction efficiency.

Figure 2:
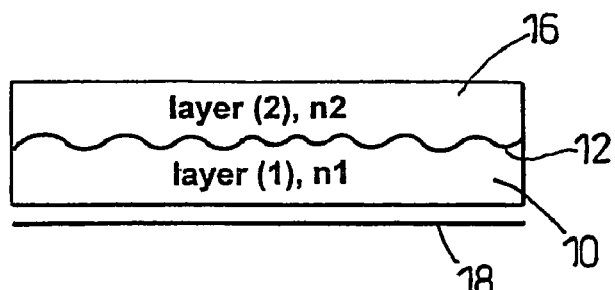
FIG. 2 is a schematic view of an alternative version of a type 'A' device.

Referring to FIG. 2, in another type of reflective mode device, instead of providing a reflective layer 14 between the substrate 10 and the upper layer 16, the surface of the substrate layer 10 from the interface may be made reflective, as shown by reflective layer 18 in FIG. 2. Similarly the upper surface of layer 16 may be rendered reflective. To have sufficient diffractive efficiency the refractive indices of the substrate layer 10 and the layer 16 must differ in order to avoid index matching.

Figure 3:
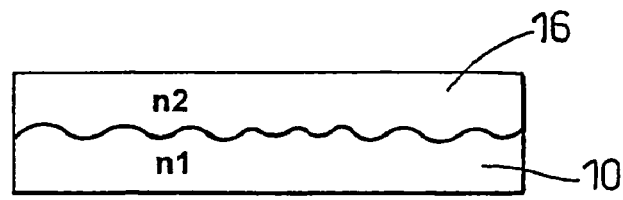
FIG. 3 is a schematic view of a type 'A' device when used in transmissive mode.

The devices can be made to work in transmission. Referring to FIG. 3, in transmissive mode, both the upper layer 16 and the substrate 10 are transparent. To have sufficient diffractive efficiency, the refractive indices of substrate 10 ($n_1$) and layer 16 ($n_2$) must differ in order to avoid index matching. Practical curable resins can give:

$\Delta n = n_1 - n_2 = 0.2$ $n_1 \sim 1.4$ $n_2 \sim 1.6$

Therefore the depth of the structures should in general be larger than in the reflective case to get sufficient difference in the optical path. The other parameters and structures are similar to the reflective case.

The operation of type B devices which use liquid crystalline materials to provide optical phase modulation/retardation are described in e.g. "Optical LPP/LCP Devices—A New Generation of Optical Security Elements" Proceedings of SPIE Vol 3793 (2000), pp 196-203 and "New Coloured Optical Security Elements Using LPP/LCP Technology" Proceedings of SPIE Vol. 4672 (2002). The operation of a transmissive and reflective device is also explained in these references.

First Embodiment

Figure 4:
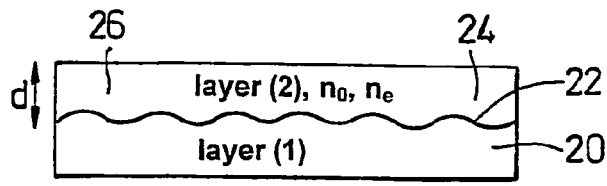
FIG. 4 is a schematic view of an optical device in accordance with an embodiment of the invention, for use in reflective mode.

Referring to FIG. 4, in this embodiment, the whole area of the device acts both to apply a diffractive effect (type A) to produce a first image and a phase modulation/retardation (type B) to produce a second image.

In this case the relief structure (p, D) is similar to that described in that of the previously described grating design for a Type A diffractive security optical device. In this embodiment the polymerisable liquid crystal material is RMM34 (from Merck) but other similar types are available. This material has extraordinary and ordinary refractive indices $n_e=1.68$ and $n_o=1.525$, giving $\Delta n=0.155$.

The optical retardation $\delta$ is given by $\delta=2d\,(n_e-n_o)$, the factor 2 being because the device is used in reflective mode. d is the thickness of the optically anisotropic layer.

For $\lambda=0.5$ μm for average visible light, this gives:

$d=0.8065$ μm for (½λ plate)

$d=0.4032$ μm for (¼λ plate)

It is known that a ½λ retardation alters the direction of polarization of a linearly polarized light, with the angle of rotation depending on the angle between the direction of polarization and the optical axis of the optically anisotropic layer. A ¼λ retardation converts linearly polarized light into circularly polarized light, and the local orientation of the molecules in the optically anisotropic layer.

In this embodiment the thickness is selected to give ½λ retardation. The whole device works both as a diffractive device (type A), and also as type B when viewed appropriately. In the case B the modulation of the polarization follows the orientation of the diffractive pattern.

In this embodiment, there is provided a layer 20 similar to that of type A devices, made of suitable material e.g. UV curable resin or embossable thermoplastic resin. In this particular embodiment the device is used in reflective mode. The upper surface of the layer 20 carries a relief structure 22 and this has a reflective surface 24 as previously. On top of the layer 20 is coated an optically anisotropic layer 26 such as a liquid crystal polymer or a polymerisable liquid crystal material. The thickness 'd' of the layer is chosen to give the required retardation of ½λ, as previously explained.

Thus when used as a security device, authentication involves the steps of checking for a diffractive image (by the naked eye or by machine) and also for a related polarization modulation/phase retardation giving a second image when viewed through one or more appropriately aligned polarizers with defined polarization properties.

Figure 5:
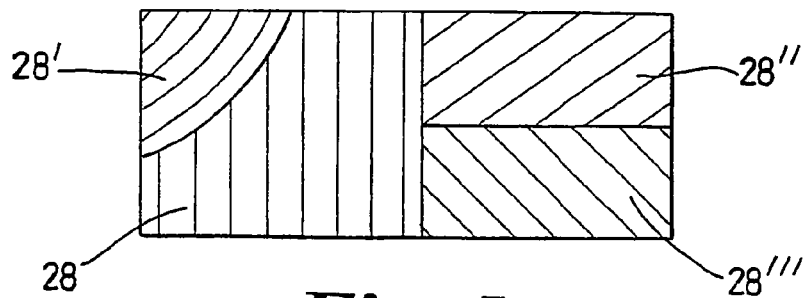
FIG. 5 is a schematic plan view of an optical device in accordance with this invention showing an arrangement in which the relief pattern is arranged in regions or domains of different orientations.

Referring to FIG. 5, in this first embodiment, the orientation of the patterns in the relief structure may be arranged in differently aligned domains or regions 28, 28', 28", 28'" etc. In each domain or region the pitch and depth of the relief structure lies within those of the visible diffraction regime, i.e. D=0.2 to 0.5 μm and p=0.5 to 2.0 μm. The differently aligned domains or regions thus define corresponding regions in each of which the optical axis of the optically anisotropic layer is aligned at different orientations.

Note also that this embodiment may be modified by rendering the lower surface of the layer 20 or the upper surface of layer 26 reflective rather than the interface between the layer 20 and the optically anisotropic layer 26.

Second Embodiment

Figure 6:
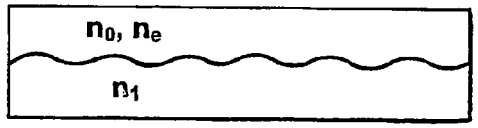
FIG. 6 is a view of an optical device in accordance with this invention for operating in transmissive mode.

In this embodiment illustrated in FIG. 6, the device is constructed to be viewed in transmission mode. The layer 20 is isotropic but transparent and carries a micro-relief diffractive structure 22 which serves also to align the anisotropic liquid crystal material layer 26.

In this case the retardation is given by $\delta=(n_e-n_o)\cdot d$, and so for ½λ requires d=1.613 μm ($\lambda=0.5$ μm).

In a variation of embodiment, the interface may be only partly coated with a reflective layer, with the remainder being transmissive so that the device operates as ½λ plate in transmission and a full λ plate in reflection (e.g. no retardation). Accordingly, in this variation a thickness d=0.8065 μm may be selected to give operation of ¼λ in transmissive mode and operation of ½λ in reflective mode.

Third Embodiment

In this embodiment, all or part of the optical device is constructed so that, although the substrate carries a micro-relief grating structure, its diffractive properties are minimal or negligible. Referring to Equation (1) it will be seen that if p (pitch of the grating) is small (e.g. p=0.2 or 0.1 μm or less) then all the diffractive orders are suppressed. Furthermore, if the depth of the structure is very small, e.g. D~0.05 μm or less, then it is known from diffraction theory that the diffraction efficiency of the grating will be very low, in fact very little light is diffracted. However with these parameters (e.g. p~0.1 μm, D~0.05 μm) it should be emphasised that alignment will continue to occur quite efficiently, and this regime may be termed "alignment only". In this regime the grating parameters for p or D are as above. In practice the device will diffract poorly if either of the parameters is in this regime and certainly does so if both are of the same regime.

This allows provision of selected domains which operate as in the first and second embodiments, e.g. acting as type A and B, and other selected domains which act only as type B (e.g. which do not diffract, but do alter polarization). A significant advantage is that both features can be placed on the same device using the same origination and manufacturing process. The other parameters regarding materials, thickness of coating etc. are the same as in the previous embodiments. The device may be suitably constructed to operate in transmissive and in reflective modes.

Figure 7:
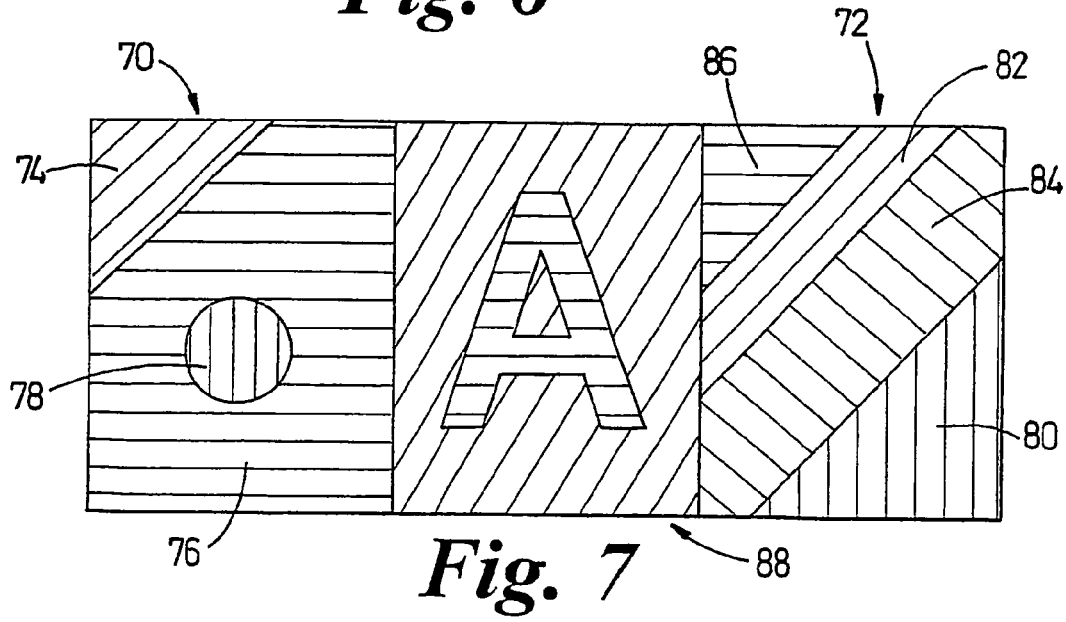
FIG. 7 is a plan view of a embodiment of this invention including various domains, some of which apply type 'A' and type 'B' effects, and some of which apply type 'B' only.

An example of such device is shown schematically in FIG. 7. In this example the device has three distinct regions; the left hand and right hand regions 70, 72 respectively are standard diffractive regions and carry micro-relief structures which have pitch and depth dimensions to provide a visible diffractive image, and they also act to align the liquid crystal material to provide optical retardation/polarization modulation. They therefore function as type A and B regions. In this example, the thickness of the liquid crystal material over the whole device is selected to give ½λ retardation in reflective mode. The illustrated device is intended to be viewed for authentication purposes through a suitable polarizer (not shown) with its plane of polarization at +45° to the edge of the device. In the left hand region there is a first domain 74 in which the micro-relief grating pattern is exactly aligned with the +45° orientation of the polarizer. Thus the optical axis of the liquid crystal material in domain 74 will be exactly aligned with the plane of polarization. In this region, when viewed in reflection mode via the polarizer, the liquid crystal material will not affect the polarization and so the image will look bright (and also will diffract). However in the other domains 76, 78 in the left hand region the optical axis is at +45° and −45° respectively to the plane of polarization and so when viewed the image will look dark because the polarization plane of the light in each case is rotated through 90° so that it is blocked. Likewise, in the right hand panel 72, domains 80 and 86 in which the micro-relief grating pattern extends ±45° to the plane of the polarizer will appear black, whereas domains 82 and 84 in which the pattern extends at 0° and 90° to the plane of the polarizer respectively, the region will appear bright.

It will be noted that the 90° pattern to the plane of the polarizer merely causes the polarization to be rotated through 180° and thus light will pass through the polarizing filter.

The central section 88 is a region of little or no diffraction e.g. with pitch and depth of 0.1 µm and 0.05 µm respectively. Different orientations can be designed to cause different (or no) modulation of linearly polarized light. The background is a pattern which aligns the optical axis of the liquid crystal material to ±45°, whereas the letter A is a region in which the liquid crystal material is aligned to 0°. In this example the letter A will be invisible when viewed by the naked eye (because there is very little diffraction and so the whole surface will appear as a reflector). However, when a polarizer aligned at +45° is used, the letter A will become visible. The background region does not alter the polarization of the reflected light because of alignment between its optical axis and the polarizer. The pattern in the letter A will rotate the +45° polarization plane by +90° and the letter A will appear black when seen through polarizer at +45°.

In this embodiment type A and B and type B only domains are provided side by side on the same device. Again, both the same substrate and the same origination and manufacturing processes as well as materials.

As explained above in connection with the domains 82 and 84, it is possible to have arrangement in which only diffraction will be visible and the polarization is not modified (e.g. type A only) even when viewed with polarized light through a polarizer. It will be appreciated that, as the micro-relief pattern is in the form of parallel straight lines, it effectively determines the direction of the optical axis, and so any linearly polarized light which is parallel or vertical to these gratings is unaltered.

Thus whether viewed with the naked eye or through a polarizer at 0° or 90° the light distribution due to diffraction will be identical, and so the device effectively operates as a type A device only. It is possible to combine this with non-diffractive structures at ±45° to the above which will become visible when viewed with the aid of a polarizer. This can be used to reveal numbers, letters or symbols encoded on the DOVID.

Fourth Embodiment

Figure 8:
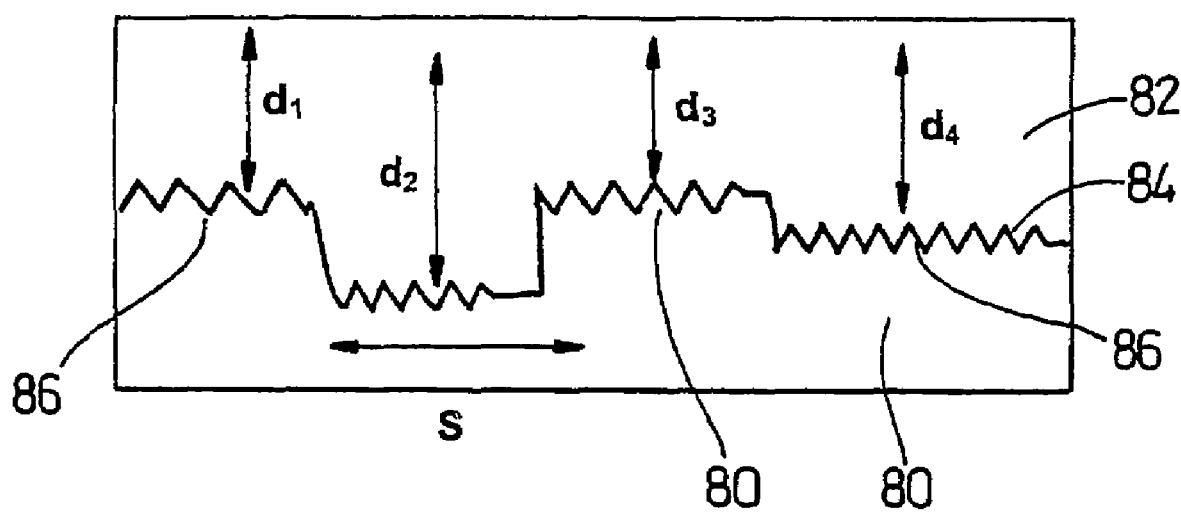
FIG. 8 is a schematic view of a further embodiment of this invention comprising a stepped substrate layer on which a relief structure is provided to provide an anisotropic layer of stepped thicknesses.

Referring to FIG. 8, this embodiment comprises a structure with steps on which a diffractive aligning pattern (or a non-diffractive aligning pattern in part) is superimposed. As previously, there is an embossable layer 80 on top of which is provided a coating of a liquid crystal material 82 of similar properties to that of the previously embodiments. As previously the device may be used in reflective or transmissive modes or a mixture of both, by selective application of a reflective layer 84. The substrate carries a pattern 86 which may provide alignment and diffraction properties or alignment alone.

In this embodiment, the substrate has discrete steps of $d_1$ to $d_4$ depth. The pitch S of these steps can be from say 0.1 mm to a few millimetres e.g. S>>p. Depending on the size of the device, S may be larger than a few millimetres. The stepped surfaces can each carry a micro-relief pattern or alignment structure 86. The diffraction due to this micro-relief pattern will be seen in normal visualisation (e.g. by the naked eye) and the steps will not be seen (because S>>p). For example, the micro-relief pattern can have a pitch of 1.0 µm and depth of 0.2 µm (or part of it can have micro-structures of the aligning-only regime).

The depths of the steps, $d_1$ to $d_4$, can be selected to give a particular retardation δ according to $\delta=2d(n_e-n_o)$ (reflective) or $\delta=d(n_e-n_o)$ (transmissive).

The stepped structure allows the provision of different retardations δ on the same device. The stepped structure is used to add another feature to the operation of the device, without extra manufacturing steps or different materials. The stepped structure may be achieved in various ways; for example, a modified origination method may be used to form the steps (e.g. multi-exposure of photo-resist, or exposure of a grey level mask to give different exposure levels, and hence different depths, when developed).

It is known (as shown in "New Coloured Optical Security Elements Using LPP/LCP Technology" Proceedings of SPIE Vol. 4672 (2002) and references therein) that films with specific retardation can generate colour effects when viewed through suitable polarizers. Hence $d_1$ to $d_4$ can be selected to give different colours. For example retardation δ=0.580 µm will generate blue colour while δ=0.320 µm will produce yellow colour. These correspond to layer thickness d=3.742 µm and 2.065 µm respectively in transmission. These colours are much more evident in a transmissive configuration.

As previously mentioned, the actual aligning structure can be such that it only produce alignment and no diffraction. Thus with the aid of suitable polarizers different colours can be generated on the same device side by side.

For example, $d_1$, $d_2$ and $d_3$ can be selected to correspond to $\delta_1$, $\delta_2$, $\delta_3$ for specific colours (for example red, green and blue) when viewed with the aid of suitable polarizers.

In a variation, this substrate may be sloping rather than stepped, or otherwise contoured to provide a selected continuous variation in retardation.

Fifth Embodiment

An optical storage device is constructed by providing on a substrate a micro-relief pattern comprising an array of distinct regions or pixels each having a respective micro-relief pattern each defining a respective optical axis in the optically anisotropic layer. The local orientation of this pattern, and thus the local optical axis may take a variety of directions in each region and in this way a corresponding variety of polarisations may be encoded by each region or pixel. Thus instead of each region or pixel simply being 'on' or 'off' as in conventional arrangements, the pixel may encode several values according to the number of different polarizations that may be discriminated in the region or pixel, so that each pixel represents a multi-state code symbol. An optical storage reader may comprise means for scanning or viewing the regions on the optical storage device and for detecting or responding to the polarizations to provide an output corresponding to the information encoded in the scanned regions.

An example of making an optical device in accordance with this invention will now be described by way of example only.

EXAMPLE

In the first stage, suitable micro-structures are modelled to produce, from the same substrate, a diffracted first image and suitable alignment characteristics to provide a polarization encoded second image. From the modelling, parameters such as the shape and size of the structures, their depth, spatial distribution and pitch are selected. Having identified the required surface relief structures, a master plate is prepared in photo-resist (or other materials) using for example, electron beam lithography to create the required pattern. In this manner structures with the design characteristics are produced in relief. A metal shim is then electro-formed from the photo-resist plate to produce an embossing nickel shim. The embossing nickel shim is then used to emboss the structures on a suitable polymeric substrate or a suitable embossable layer provided on a carrier. A number of substrates are replicated in this way.

If the device is to be a reflective device, a thin layer of aluminium is deposited on the structure to provide a reflective surface. Thereafter a spin coating process is used to apply a layer of polymerisable liquid crystal material on the emboss side of the replicated substrates. Other suitable methods of coating can of course be used.

The embossed surface of the substrate causes local alignment of the molecules in the polymerisable liquid crystal in a pattern corresponding to that in the embossed surfaced. The polymerisable liquid crystal material is then cured by applying UV radiation.

The device so produced is then tested for performance of the diffracted and polarization-encoded images.

In the various embodiments, a relief micro-structure is produced to give rise to diffraction and can be used to align optically anisotropic type materials. There are two main types of structures:

a) structures which cause diffraction and alignment simultaneously.

b) structures which give rise predominantly to alignment and little or no diffraction.

Using these principles, there is a wide range of device configurations, which fall into the following exemplary categories:

a) devices where diffraction and alignment occur simultaneously from the same region. When viewed with the naked eye they show a diffraction effect, and when viewed through polarizers they show diffraction effect and the effect of polarization modification due to the alignment and the selection of appropriate retardation.

b) Devices with regions as above and regions which show no diffraction but only have polarization modulation effect (on the same substrate using the same liquid crystal material thickness).

c) Devices which have a coarse step structure of different thicknesses of liquid crystal material to give rise to different retardation (on the same device). On this structure a fine structure can be superimposed which can be of diffractive nature or aligning only nature. A variation of this is to provide devices with a sloping interface (with both types of the structure).

d) Devices which show diffraction but no polarization effect, for example due to the induced type of alignment of liquid crystal material.

e) Devices which can have different combinations of the above.

Thus the embodiments of this invention provide a single device using the same structure to encode both diffractive (type A) and Optical phase (type B) features. The diffractive device already is in the form of a micro-relief structure. If this structure is coated with Liquid Crystal Polymers or polymerisable liquid crystalline material of an appropriate thickness, then it will also act as the aligning structure, hence the same device will display diffractive optical security features (type A) as well as optical phase features (type B).

The same origination and manufacturing process is used for both. The device will operate both as type A and type B—but from a single device and a single structure. These devices can be mass produced using origination and manufacturing techniques as type A which is cheaper and simpler than type B. It should be noted that in all the above embodiments the refractive index of the micro-relief layer can be designed so that it is substantially matched with the ordinary or extraordinary refractive index of the optically anisotropic layer. This will allow the creation of a device, or region within a device, where diffraction will occur only in one polarization.

The invention claimed is:

1. An optical device operative to apply a diffractive effect to produce a diffracted first image and a phase modulation-retardation to produce a polarized second image, said device comprising:

an encoding surface having a micro-relief pattern (22) carried over at least part thereof and having a grating direction, the micro-relief grating having a predetermined spatial distribution in which the orientation of the grating direction varies across at least part of the encoding surface thereby to produce a predetermined diffracted first image when illuminated in use, and a solid optically anisotropic layer (26) formed of a polymerized liquid crystal material operative to produce a phase modulation-retardation polarized second image, the local optical axes of the polymerized liquid crystal material lying substantially parallel to said encoding surface, and each axis being in respective alignment with the local grating direction of a corresponding adjacent part of the micro-relief grating so that the orientation of the local optical axes of the polymerized liquid crystal material of said optically anisotropic layer (26) varies across the encoding surface, wherein said optically anisotropic layer (26) imposes a predetermined spatial distribution of polarization modulation to produce a predetermined polarized second image when illuminated in use, so that both a diffracted image and a polarized image are produced in which both the diffracted image and the polarized image vary spatially across at least part of the overall image.

2. An optical device according to claim 1, wherein said micro-relief grating (22) is provided on the surface of a substrate (20) in contact with said optically anisotropic layer (26) thereby to define said encoding surface.

3. An optical device according to claim 2, wherein a coating thickness of at least part of the optically anisotropic layer (26) is selected having regard to the frequency, of the intended illumination in use, to provide a phase retardation when appropriately viewed.

4. An optical device according to claim 2, wherein the substrate (20) is transmissive and at least part of the surface thereof remote from the interface with the optically anisotropic layer (26) is reflective.

5. An optical device according to claim 2, wherein the refractive index of the micro-relief layer is substantially equal to the ordinary or extraordinary refractive index of the optically anisotropic layer.

6. An optical device according to claim 1, wherein said micro-relief grating (22) is formed on a surface of the optically anisotropic layer (26) thereby to define said encoding surface.

7. An optical device according to claim 1, wherein said micro-relief grating (22) includes one or more regions having a significant diffractive effect and one or more relatively weakly diffractive regions where there is little or no diffractive effect.

8. An optical device as claimed in claim 1, wherein said micro-relief grating (22) includes a plurality of discontinuous areas (74, 76, 78, 80, 82, 84, 86), each of which having a respective orientation of the micro-relief grating thereon, defining respective local optical axes of the optically anisotropic layer.

9. An optical device according to claim 1, wherein a coating thickness of at least part of the optically anisotropic layer (26) is selected having regard to the frequency of the intended illumination in use, to provide phase retardation when appropriately viewed.

10. An optical device according to claim 1, wherein at least one of: the average thickness of the optically anisotropic layer (26), and its birefringence varies with position across said device to vary the optical retardation induced thereby.

11. An optical device according to claim 10, wherein the thickness of said optically anisotropic layer (26), disregarding the micro-relief grating, is generally continuously contoured.

12. An optical device according to claim 11, wherein the thickness of said optically anisotropic material (26), disregarding the micro-relief grating, varies linearly in at least one dimension.

13. An optical device according to claim 1 wherein the micro-relief grating (22) is stepped, whereby the thickness of the optically anisotropic layer (26) is stepped by a step distance which is substantially greater than the structure pitch dimension, thereby to provide regions of respective selected retardations.

14. An optical device according to claim 1, wherein the encoding surface is reflective (24) over at least part of the device, whereby at least part of said device is adapted to operate in reflection mode.

15. An optical device according to claim 1, wherein at least part of the surface of the optically anisotropic layer (26) remote from the encoding surface is at least partially reflective.

16. An optical device according to claim 1, adapted to operate in use in transmission mode.

17. An optical device according to claim 1, adapted to operate in use in reflection mode.

18. An optical device according to claim 1, wherein said optically anisotropic layer (26) comprises a polymerisable liquid crystalline material fixed to a single substrate, and the polarized image is obtained through local polarization modulations on the single substrate, said anisotropic layer remaining always anisotropic.

19. A security device including an optical device according to claim 1.

20. A bank note including an optical device according to claim 1.

21. A security document including an optical device according to claim 1.

22. An Identification Card including an optical device according to claim 1.

23. A container including an optical device according to claim 1.

24. Packaging including an optical device according to claim 1.

25. A data storage device including an optical device according to claim 1.

26. A method of authentication of an article or substance, which comprises applying to said article or substance an optical device in accordance with claim 1, and thereafter examining said article or substance for the presence of at least one of said first and second images.

27. A method of producing an optical device which comprises:
   providing an encoding surface having a micro-relief grating (22) carried over at least part thereof and having a grating direction,
   the micro-relief grating having a predetermined spatial distribution in which the orientation of the grating direction varies across at least part of the encoding surface thereby to produce a predetermined diffracted first image when illuminated in use, and
   providing a solid optically anisotropic layer (26) formed of a polymerized liquid crystal material operative to produce a phase modulation-retardation polarized second image, the local optical axes of the polymerized liquid crystal material lying substantially parallel to said encoding surface, and each being in respective alignment with the local grating direction of a corresponding adjacent part of the micro-relief grating so that the orientation of the local optical axes of the polymerized liquid crystal material of said optically anisotropic layer (26) varies across the encoding surface,
   whereby said optically anisotropic layer (26) imposes a predetermined spatial distribution of polarization modulation thereby to produce a predetermined polarized second image when illuminated in use,
   so that both a diffracted image and a polarized image are produced in which both the diffracted image and the polarized image vary spatially across at least part of the overall image.

28. A method according to claim 27, which includes providing a micro-relief grating and applying said layer of optically anisotropic material thereto thereby to define said encoding surface, said a micro-relief grating comprising a substrate, said anisotropic material being polymerized and fixed, the polarized image being obtained through local modulations made only on the substrate, said anisotropic layer remaining always anisotropic.

29. A method according to claim 27, wherein said micro-relief grating is formed by embossing.

30. A method according to claim 27, wherein said micro-relief grating is formed by UV curing of a suitable material in contact with a master.

* * * * *